US009684291B2

(12) United States Patent
Fiori (10) Patent No.: US 9,684,291 B2
(45) Date of Patent: Jun. 20, 2017

(54) GOAL-DRIVEN HUMAN-MACHINE INTERFACE (71) Applicant: TETRA LAVAL HOLDINGS & FINANCE S.A., Pully (CH)

(72) Inventor: Mauro Fiori, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 486 days.

(21) Appl. No.: 14/349,532

(22) PCT Filed: Oct. 24, 2012

(86) PCT No.: PCT/EP2012/071089
§ 371 (c)(1),
(2) Date: Apr. 3, 2014

(87) PCT Pub. No.: WO2013/060747
PCT Pub. Date: May 2, 2013

(65) Prior Publication Data
US 2015/0005906 A1    Jan. 1, 2015

(30) Foreign Application Priority Data
Oct. 24, 2011  (EP) ..................... 11186411

(51) Int. Cl.
*G05B 15/02* (2006.01)
*G06F 3/0484* (2013.01)
(Continued)

(52) U.S. Cl.
CPC ......... *G05B 15/02* (2013.01); *G05B 19/0426* (2013.01); *G05B 19/418* (2013.01); *G06F 3/04842* (2013.01)

(58) Field of Classification Search
None
See application file for complete search history.

(56) References Cited

U.S. PATENT DOCUMENTS

| 8,019,583 B1 | 9/2011 | Sturrock et al. |
| 8,543,233 B2 | 9/2013 | Donati et al. |
| 8,989,879 B2 * | 3/2015 | Hayes ........................ 700/100 |

FOREIGN PATENT DOCUMENTS

| CN | 101086760 A | 12/2007 |
| CN | 101292683 A | 10/2008 |

(Continued)

OTHER PUBLICATIONS

International Search Report (PCT/ISA/210) mailed on Jan. 18, 2013, by the European Patent Office as the International Searching Authority for International Application No. PCT/EP2012/071089.

(Continued)

*Primary Examiner* — Qing Wu (57) ABSTRACT

A Human-Machine Interface (HMI) for industrial equipment which is operable to assume several operating states, and to achieve several user-selectable goals, each achievable from one or more operating states. The HMI is designed to be coupled with an equipment control unit of the industrial equipment. The equipment control unit is designed to determine a current operating state assumed by the industrial equipment based on received equipment operating data; in response to a goal selection, to cause the industrial equipment to achieve the selected goal; and to execute equipment-related functions including user-selectable functions, each of which is associated with one or more user-selectable goals and is executed by the equipment control unit in response to a function selection. The HMI comprises a display unit and a display control unit, which is coupled with the display unit and is couplable also with the equipment control unit to acquire therefrom data.

12 Claims, 4 Drawing Sheets

(51) Int. Cl.
    *G05B 19/042*      (2006.01)
    *G05B 19/418*      (2006.01)

(56) References Cited

FOREIGN PATENT DOCUMENTS

| | | | |
|---|---|---|---|
| CN | 101833294 | A | 9/2010 |
| EP | 1 906 279 | A2 | 4/2008 |
| EP | 2 075 661 | A1 | 7/2009 |
| GB | 2 463 795 | A | 3/2010 |
| JP | 2001290917 | A | 10/2001 |
| JP | 2011508327 | A | 3/2011 |
| WO | WO 2009/083594 | A1 | 7/2009 |
| WO | WO 2009/083595 | A1 | 7/2009 |
| WO | WO 2009/083597 | A1 | 7/2009 |
| WO | WO 2009/083598 | A1 | 7/2009 |
| WO | WO 2010/037145 | A2 | 4/2010 |

OTHER PUBLICATIONS

International Preliminary Report on Patentability (PCT/IPEA/409) mailed on Dec. 19, 2013, by the European Patent Office as the International Preliminary Examining Authority for International Application No. PCT/EP2012/071089.
English language translation of Office Action issued on Nov. 4, 2015, by the State Intellectual Property Office of China in corresponding Chinese Patent Application No. 201280052211.9. (9 pages).

* cited by examiner

GOAL-DRIVEN HUMAN-MACHINE INTERFACE

TECHNICAL FIELD OF THE INVENTION

The present invention relates to a goal-driven Human-Machine Interface (HMI) for an industrial equipment or machine, in particular for an industrial equipment or machine in a food processing and/or packaging system, to which the following description specifically refers purely by way of example.

BACKGROUND ART

As is known, on a factory floor of a food packaging plant, several specifically-aimed processes are generally performed, including incoming food and packaging material storage, food processing, food packaging, and package warehousing.

In particular, food packaging is performed in Packaging Lines, each of which is an assembly of machines and equipments for the production and handling of packages, and includes a Filling Machine for the production of the packages, followed by one or more defined configuration(s) of downstream Distribution Equipments, such as accumulators, straw applicators, film wrappers, and cardboard packers, connected to the Filling Machine via Conveyors for the handling of the packages.

A typical example of this type of packages is the parallelepiped-shaped package for liquid or pourable food products known as Tetra Brik Aseptic®, which is made by folding and sealing a laminated web of packaging material.

The packaging material has a multilayer sheet structure substantially comprising one or more stiffening and strengthening base layers typically made of a fibrous material, e.g. paper, or mineral-filled polypropylene material, covered on both sides with a number of heat-seal plastic material layers, e.g. polyethylene film. In the case of aseptic packages for long-storage products, such as UHT milk, the packaging material also comprises a gas- and light-barrier material layer, e.g. aluminium foil or ethyl vinyl alcohol (EVOH) film, which is superimposed on a heat-seal plastic material layer, and is in turn covered with another heat-seal plastic material layer forming the inner face of the package eventually contacting the food product.

Packages of this sort are produced on fully automatic Filling Machines, wherein a continuous vertical tube is formed from the web-fed packaging material; which is sterilized by applying a chemical sterilizing agent such as a hydrogen peroxide solution, which, once sterilization is completed, is removed, e.g. evaporated by heating, from the surfaces of the packaging material; and the sterilized web is maintained in a closed, sterile environment, and is folded and sealed longitudinally to form the vertical tube. The tube is then filled downwards with the sterilized or sterile-processed pourable food product, and is fed along a vertical path to a forming station, where it is gripped along equally spaced cross sections by two pairs of jaws, which act cyclically and successively on the tube, and seal the packaging material of tube to form a continuous strip of pillow packs connected to one another by transverse sealing strips. Pillow packs are separated from one another by cutting the relative sealing strips, and are conveyed to a final folding station where they are folded mechanically into the finished, e.g. substantially parallelepiped-shaped, packages.

Alternatively, the packaging material may be cut into blanks, which are formed into packages on forming spindles, and the packages are filled with food product and sealed. One example of this type of package is the so-called "gable-top" package known as Tetra Rex®.

Applicant's PCT applications WO 2009/083594, WO 2009/083595, WO 2009/083597, and WO 2009/083598, the contents of which are incorporated herein by reference, disclose a new-generation Packaging System which includes:

- one or more Packaging Line(s) automatically configurable to produce Packaged Consumer Products; each Packaging Line comprising a Filling Machine or Equipment, and one or more downstream Distribution Equipment(s) connected via Conveyors; each Filling Machine being operable to selectively produce one or different type(s) of sealed packages; each sealed package containing one or different food product(s) introduced therein by pouring, and being made of a multi-layer sheet (laminated) packaging material including at least one stiffening and strengthening base layer and one or more heat-seal plastic layer(s); each Distribution Equipment being operable to carry out a corresponding packaging operation on incoming individual or groups of sealed packages; each Filling Machine and each Distribution Equipment including a respective electronic control unit designed to store and execute one or more software module(s);
- one or more Line Controller(s) each programmed to manage configuration, communication and control of one or more respective Packaging Line(s), and including a respective electronic control unit designed to store and execute software applications configured to cooperate with the software modules in the Filling and the Distribution Equipments in the respective Packaging Line(s); and
- a Communication Network designed to connect each Line Controller to the Filling and the Distribution Equipments in the respective Packaging Line(s).

The Packaging System may be:

- of the Single-Line type, namely including only one Packaging Line;
- of the Multi-Line type, namely including a plurality of operatively stand-alone Packaging Lines, i.e., Packaging Lines which do not share any Distribution Equipment, each provided with an associated Line Controller; or
- of the Multi-Switch type, namely with a plurality of operatively cooperating Packaging Lines, i.e., Packaging Lines arranged to share one or more Distribution Equipment(s), so increasing the flexibility and the production variability for the customer.

In a Multi-Switch Packaging System, either a single-tier or a two-tier control architecture may be provided. In a single-tier control architecture, only a single, common Line Controller is provided, which is programmed to manage configuration, communication and control of all the Packaging Lines with the aim of optimizing the interaction between the Filling Machines and the Distribution Equipments to improve the Multi-Switch Packaging System performance and product transportation during production, while in a two-tier control architecture, both a slave Line Controller for each Packaging Line and a master Line Controller for the slave Line Controllers are provided.

Figure 1:
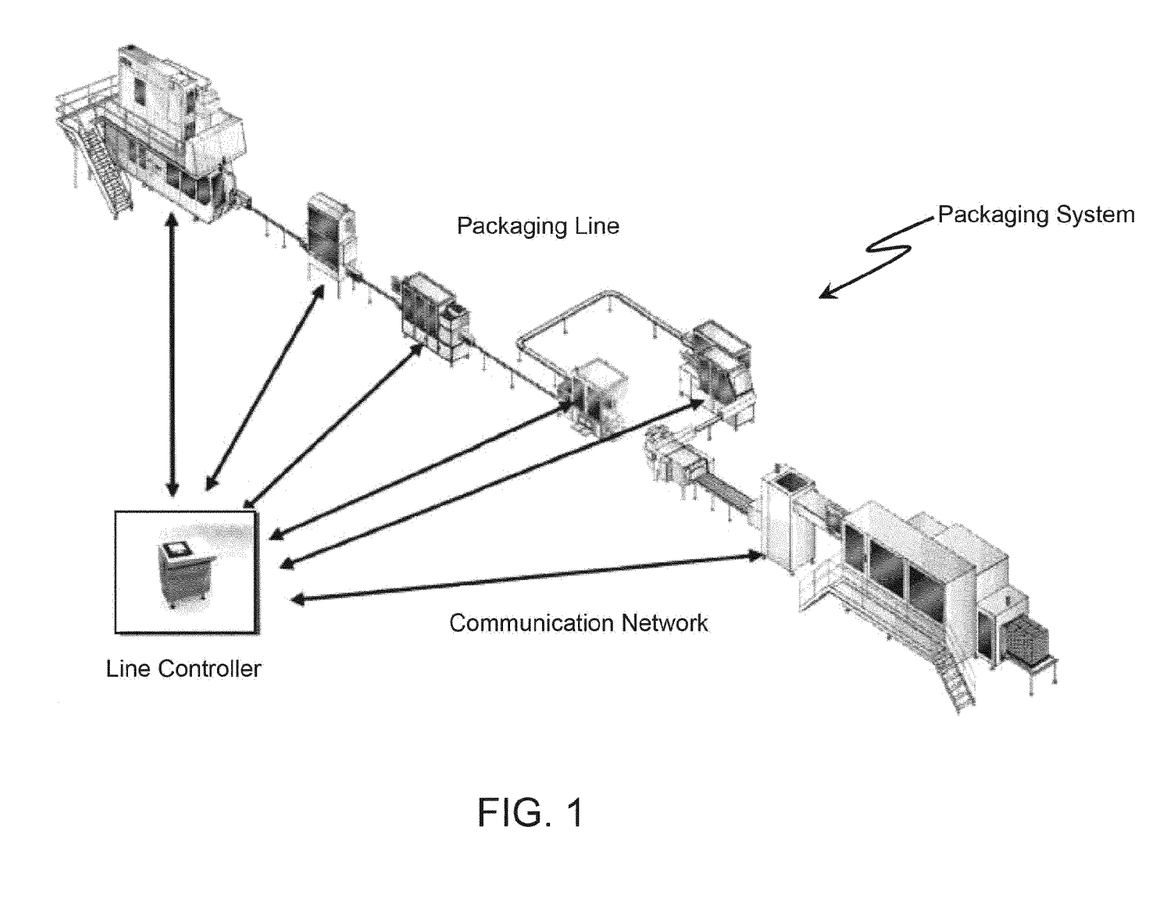
FIG. 1 shows a schematic layout of an integrated Packaging System.

FIG. 1 shows, by way of example, a schematic layout of an integrated Packaging System of the type disclosed in the aforesaid PCT applications, specifically, for the sake of drawing simplicity, of the Single-Line type.

In particular, the Packaging System shown in FIG. 1 includes:

- a single Packaging Line comprising a Filling Machine or Equipment followed by downstream Distribution Equipments, such as Accumulators, Straw Applicators, Cap Applicators, Handle Applicators, Cardboard Packers, Film Wrappers, Configuration Switches, Dynamic Switches, and Pallet Systems, which are cascade connected to each other and to the Filling Machine via Conveyors, the Filling and the Distribution Equipments being all known per se and hence not described herein in detail;
- a Line Controller designed to manage configuration, communication and control of the Packaging Line with the aim of optimizing the interaction between the Filling Machine and the Distribution Equipments to improve the Packaging Line performance and product transportation during production; and
- a Communication Network designed to connect the Line Controller to the Filling and the Distribution Equipments.

As previously described, the Filling Machines, the Distribution Equipments and the Line Controllers in the Packaging Systems of the type disclosed in the aforesaid PCT applications are each provided with a respective electronic control unit which:

- is configured to control operation thereof by executing functions automatically and in response to user's selections; and
- is provided with a Human-Machine Interface (HMI) including
  - a display unit, such as a touch screen, and
  - a display control unit programmed to cause a Graphical User Interface (GUI) to be displayed on the display unit.

In general, a GUI displayed by an HMI of an electronic control unit currently used in the Packaging Systems exposes user-selectable functions which can be executed by the electronic control unit. A selection, such as a touch selection, of a user-selectable function causes said user-selectable function to be executed by the electronic control unit.

In particular, the GUI exposes all the user-selectable functions which are executable by the electronic control unit thus resulting in a visual information overload for users interacting with the HMI, which visual information overload could even lead a user to make a selection error.

OBJECT AND SUMMARY OF THE INVENTION

The objective of the present invention is thence to provide a Human-Machine Interface (HMI) which can alleviate at least in part the above cited drawbacks.

This objective is achieved by the present invention in that it relates to a Human-Machine Interface (HMI), an equipment control unit, an industrial equipment, a food processing and/or packaging system, a method for operating a Human-Machine Interface (HMI), and a software program product for implementing said method, as defined in the appended claims.

In particular, the present invention relates to a Human-Machine Interface (HMI) for an industrial equipment, which industrial equipment is operable to assume several operating states and to achieve several user-selectable goals, each achievable from one or more operating states.

The HMI according to the present invention is designed to be coupled with an equipment control unit of the industrial equipment. Said equipment control unit is designed to:

- determine a current operating state assumed by the industrial equipment based on received equipment operating data;
- in response to a goal selection, cause said industrial equipment to achieve the selected goal; and
- execute equipment-related functions including user-selectable functions, each of which is associated with one or more user-selectable goals and is executed by the equipment control unit in response to a function selection.

The HMI according to the present invention comprises:

- a display unit; and
- a display control unit which is coupled with the display unit and is couplable also with the equipment control unit to acquire therefrom data indicative of the current operating state assumed by the industrial equipment.

The display control unit is configured to:

- store a list of the user-selectable goals achievable by the industrial equipment, and, for each user-selectable goal,
  - a list of the operating states from which said user-selectable goal is achievable, and
  - a list of the user-selectable functions associated with said user-selectable goal;
- display on the display unit the user-selectable goals which are achievable from the current operating state; and,
- in response to a selection of a displayed goal, display on the display unit only user-selectable functions which are associated with the selected goal.

Moreover, the present invention relates also to a method for operating a HMI for a industrial equipment of the aforesaid type, said HMI comprising a display unit.

In particular, the method according to the present invention comprises:

- acquiring from the equipment control unit data indicative of the current operating state assumed by the industrial equipment;
- displaying on the display unit the user-selectable goals which are achievable from the current operating state; and,
- in response to a selection of a displayed goal, displaying on the display unit only user-selectable functions which are associated with the selected goal.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREFERRED EMBODIMENTS OF THE INVENTION

The following description is provided to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

The present invention concerns a Human-Machine Interface (HMI) for an industrial equipment, or machine, such as a Filling Machine, a Distribution Equipment or a Line Controller in a food processing and/or packaging system of the type previously described, which industrial equipment is operable to:

perform several actions comprising actions performable automatically by the industrial equipment and actions performable by the industrial equipment in response to corresponding commands;

perform several tasks each including one or more respective action(s), said tasks comprising tasks performable automatically by the industrial equipment and tasks performable by the industrial equipment in response to respective commands;

assume several operating states each associated with respective performable tasks; and achieve several user-selectable goals each associated with a corresponding operating path to be followed by the industrial equipment in order for said industrial equipment to achieve said associated user-selectable goal, each operating path being a sequence of respective operating states comprising at least a respective initial operating state and a respective final operating state.

Preferably, some operating paths can comprise one or more respective intermediate operating state(s) between the respective initial and final operating states.

Conveniently, an operating state may be present in only one operating path or in different operating paths. For example, in the case of a Filling Machine in a Packaging System, a "Signal From Sterilizer" operating state can be present both in an operating path associated with a "Preparation" goal and in an operating path associated with a "Production" goal.

The industrial equipment, or machine, previously described is a goal-driven equipment configured to achieve several user-selectable goals by passing through subsequent actions, tasks and operating states. An operating state of an industrial equipment is determined by a combination of features, parameter values and configurations of the industrial equipment, such as, in the case of a Filling Machine in a Packaging System, steam temperature, pre-heating elements, paper positions, valve positions, sealing parameters, aseptic parameters, peroxide parameters, etc. In order for a goal-driven equipment to achieve a specific goal selected by a user, namely an operator of said industrial equipment or a specialized technician in charge of operating said industrial equipment, said goal-driven equipment has to follow the specific operating path associated with said specific goal by assuming all the specific operating states of said specific operating path, by performing, in each specific operating state assumed, the specific tasks associated with said specific operating state assumed, and by carrying out, for each specific task performed, the specific actions of said specific task performed. If the selected goal is associated with an operating path comprising only the initial and final operating states, said selected goal is achieved after its selection as soon as the goal-driven equipment assumes the final state, while, if the selected goal is associated with an operating path comprising one or more intermediate operating state(s) between the initial and final operating states, said selected goal is achieved after the goal-driven equipment has followed all the operating path.

Figure 2:
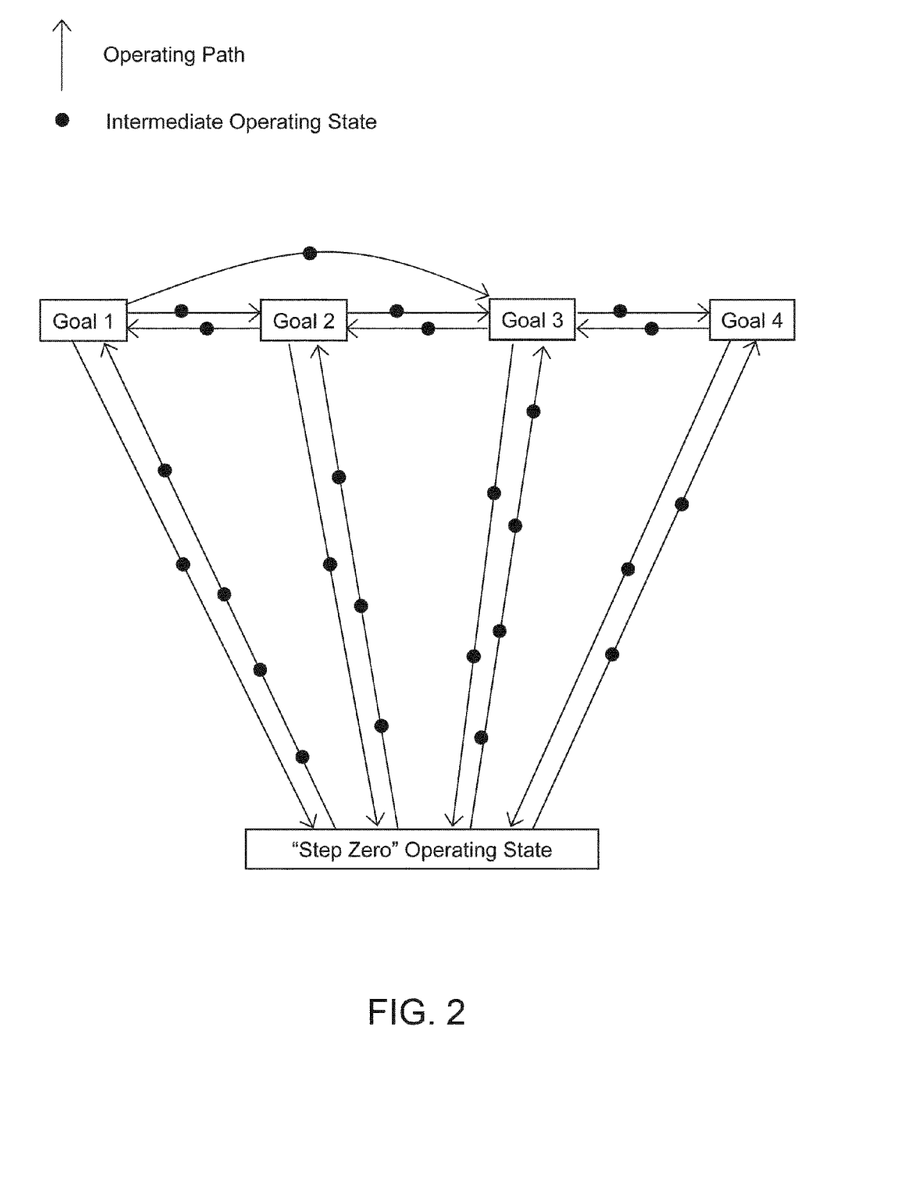
FIG. 2 schematically shows an operating logic of a goal-driven equipment.

In this connection, FIG. 2 shows a diagram which schematically represents an example of an operating logic of a goal-driven equipment.

In particular, FIG. 2 schematically illustrates:

four user-selectable goals (represented by rectangles), namely "Goal 1", "Goal 2", "Goal 3" and "Goal 4", which represent also final operating states assumed by the goal-driven equipment once it achieves said user-selectable goals, and which are achievable by the goal-driven equipment from a "State-Zero" operating state (also represented by a rectangle) which represents also a user-selectable goal which is achievable by the goal-driven equipment from the final operating states assumed by the goal-driven equipment once it achieves the "Goal 1", "Goal 2", "Goal 3" and "Goal 4", said "State-Zero" operating state conveniently representing an operating state assumed by the goal-driven equipment once it is switched on; and operating paths (represented by arrows) each to be followed by the goal-driven equipment in order for said goal-driven equipment to achieve a corresponding user-selectable goal, each operating path comprising one or more respective intermediate operating state(s) (represented by black circles) to be assumed by the goal-driven equipment in order for said goal-driven equipment to achieve the corresponding user-selectable goal.

Moreover, the industrial equipment has an equipment control unit, preferably in the form of an electronic unit, which is programmed to, i.e., is designed to store and execute a software program such that to cause, when executed, said equipment control unit to become configured to:

control operation of said industrial equipment; and in response to a selection of a goal by a user, cause said industrial equipment to follow the operating path associated with the selected goal until the goal is achieved, i.e., the respective final operating state is assumed by the industrial equipment, or a new goal is selected by the user.

In particular, the equipment control unit is coupled with the industrial equipment to provide the latter with commands, settings, configurations, etc. for operating it, and to receive data concerning operation of the industrial equipment and specifically comprising equipment operating data on the basis of which a current operating state assumed by said industrial equipment is determined. Conveniently, the equipment control unit can be installed on the industrial equipment, or can be remotely connected to the industrial equipment.

Additionally, the equipment control unit is further programmed to execute equipment-related functions which include automatic functions which are automatically executable by the equipment control unit, and user-selectable functions which are executable by the equipment control unit in response to user's selections.

Conveniently, the user-selectable functions can comprise:
setting functions each of which is such that to cause, when executed, respective settings to be applied to the industrial equipment;
alarm functions each of which is such that to cause, when executed, a respective alarm to be raised if a respective condition is met;
monitoring functions each of which is such that to cause, when executed, a respective action or task performed by the industrial equipment, or a respective operating state assumed by the industrial equipment, or a respective operating path followed by the industrial equipment, to be monitored; and
command functions each of which is such that to cause, when executed, a respective action or task to be performed by the industrial equipment.

In particular, each user-selectable function is associated with one or more corresponding user-selectable goal(s), i.e., is executable by the equipment control unit in connection with one or more corresponding user-selectable goal(s).

In detail, for each user-selectable goal, the user-selectable functions associated with said user-selectable goal comprise first user-selectable functions which are executable by the equipment control unit each in a corresponding given operating state of the operating path associated with said user-selectable goal.

Moreover, for each user-selectable goal, the user-selectable functions associated with said user-selectable goal comprise also second user-selectable functions which are executable by the equipment control unit each in a corresponding given operating state of the operating path associated with said user-selectable goal, each second user-selectable function is executable by the equipment control unit by the equipment control unit in the corresponding given operating state only if the industrial equipment has previously achieved, i.e., has achieved, prior to assume said corresponding given operating state, one or more corresponding specific goal(s), and/or has previously assumed, i.e., has assumed, prior to assume said corresponding given operating state, one or more corresponding specific operating state(s).

A Human-Machine Interface (HMI) according to a preferred embodiment of the present invention is couplable with the equipment control unit, and comprises:
a display unit, such as touch screen; and
a display control unit, preferably in the form of an electronic unit, which is coupled with the display unit to cause several Graphical User Interfaces (GUIs) to be displayed thereon.

In the following an operating logic of the HMI according to said preferred embodiment of the present invention will be described with reference to FIG. 3 which shows a flowchart representing a method 1 for operating said HMI.

In particular, the display control unit of the HMI is designed to:
acquire from the equipment control unit data indicative of a current operating state assumed by the industrial equipment (block 11 shown in FIG. 3); and
store a list of the user-selectable goals which are achievable by the industrial equipment and, for each user-selectable goal,
a list of the operating states from which said user-selectable goal is achievable, and
a list of the user-selectable functions associated with said user-selectable goal.

Figure 3:
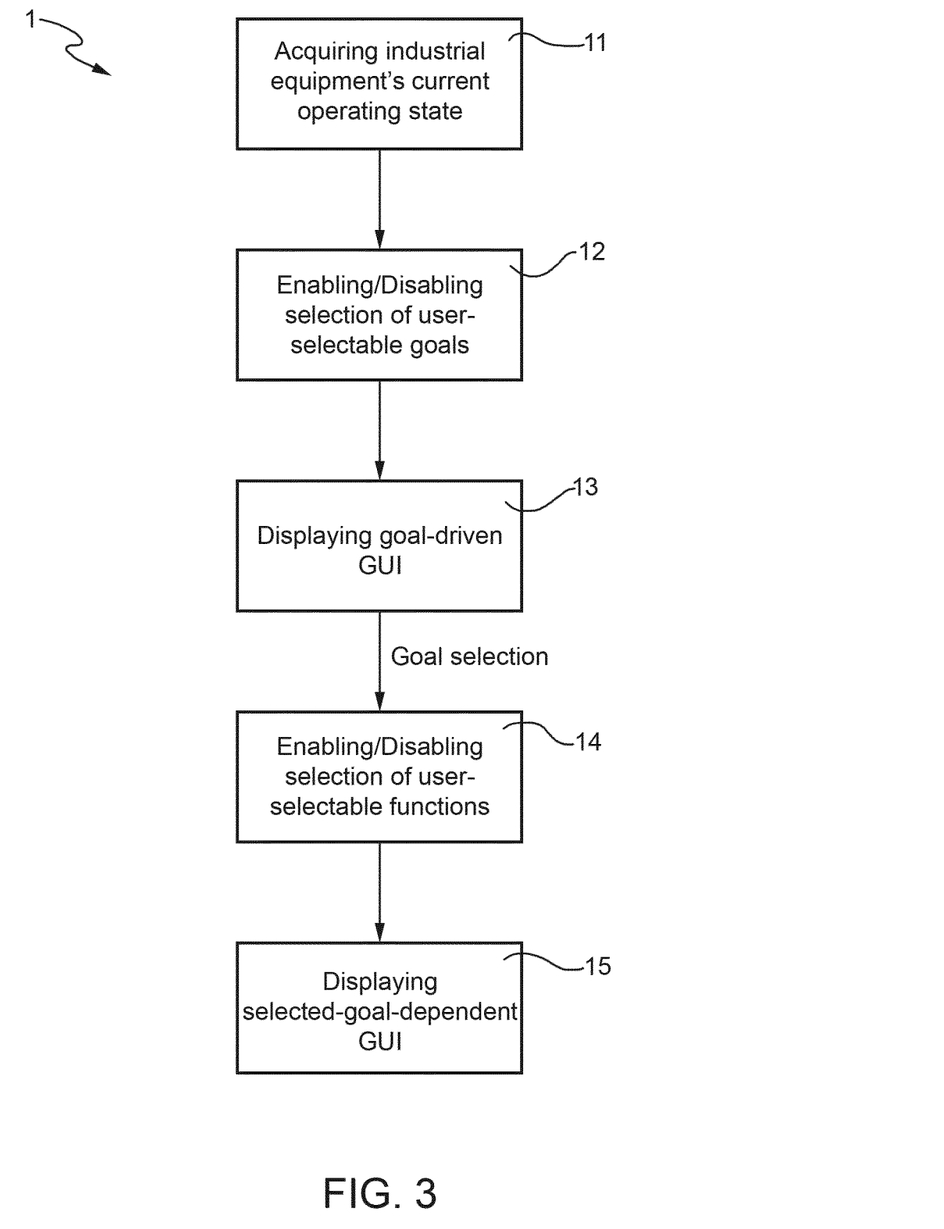
FIG. 3 schematically shows a method for operating a Human-Machine Interface (HMI) for an industrial equipment according to a preferred embodiment of the present invention.

Moreover, the display control unit is programmed to, i.e., is designed to store and execute a software program such that to cause, when executed, said display control unit to become configured to:
cause, on the basis of the acquired and the stored data, a goal-driven GUI to be displayed on the display unit, said goal-driven GUI exposing, i.e., providing graphical representations of, the user-selectable goals which are achievable from the current operating state (block 13 shown in FIG. 3); and,
in response to a selection of an exposed goal, such as a touch selection, cause, on the basis of the acquired and the stored data, a selected-goal-dependent GUI to be displayed on the display unit, said selected-goal-dependent GUI exposing, i.e., providing graphical representations of, only user-selectable functions which are associated with the selected goal (block 15 shown in FIG. 3).

Conveniently, the user-selectable goals exposed by the goal-driven GUI and the user-selectable functions exposed by the selected-goal-dependent GUI are in the form of icons and/or graphic symbols and/or soft buttons.

Preferably, the display control unit is further configured to:
enabling selection of the user-selectable goals achievable from the current operating state, and disabling selection of the user-selectable goals which are not achievable from the current operating state (block 12 shown in FIG. 3); and
cause the displayed goal-driven GUI to expose
either only the selection-enabled user-selectable goals, or the selection-enabled and the selection-disabled user-selectable goals.

Conveniently, the goal-driven GUI provides faded graphical representations of the exposed user-selectable goals which are selection-disabled.

To put the foregoing description of the HMI in another way, said HMI, by means of the goal-driven GUI, allows a user, namely an operator of the industrial equipment or a specialized technician in charge of operating said industrial equipment, to select only the goals achievable from the current operating state of the industrial equipment. This automatic, intelligent filtering of the user-selectable goals performed by the HMI reduces the possibility of user's errors in goal selection.

Moreover, the user, by selecting a selection-enabled goal exposed by the goal-driven GUI, causes the industrial equipment to know the operating path to be followed, specifically all the actions, tasks and operating states necessary to achieve the final operating state of the selected goal. In particular, in response to a goal selection, the operating path associated with the selected goal is automatically set up by the equipment control unit on the industrial equipment by using the current operating state as initial equipment state of said operating path.

At any moment the user, by interacting with the goal-driven GUI, has the possibility to see the available goals and to select one of them. As previously described, the goals that the user may select in the goal-driven GUI are not all the goals achievable by the industrial equipment, but only the ones logically defined at said moment in relation to:
if no goal has already been selected (for example please refer to the "Step Zero" operating state shown in FIG. 2 and previously described), only the current operating state; while,
if a goal has already been selected, the current operating state and the ongoing operating path.

Moreover, when the user selects a selection-enabled goal exposed by the goal-driven GUI, the HMI, specifically the display control unit, shows to the user by means of the selected-goal-dependent GUI only necessary functions, such as setting functions, monitoring functions, alarm functions and command functions, which are associated with the selected goal, while unnecessary functions, i.e., the functions not associated with the selected goal, are not shown. This automatic, intelligent filtering of the information performed by the HMI reduces the possibility of user's errors in function selection and decrease the GUI visual information overload thus resulting in an increased usability of the industrial equipment.

Preferably, the display control unit is designed to store also:
  each previous goal achieved by the industrial equipment;
  each previous operating state assumed by the industrial equipment; and,
  for each user-selectable goal, also
    the operating path associated with said user-selectable goal,
    for each first user-selectable function associated with said user-selectable goal, the corresponding given operating state of the operating path associated with said user-selectable goal in which said first user-selectable function is executable, and,
    for each second user-selectable function associated with said user-selectable goal, the corresponding given operating state of the operating path associated with said user-selectable goal in which said second user-selectable function is executable, and the corresponding specific goal(s) and/or the corresponding specific operating state(s) that the industrial equipment has to have previously achieved/assumed, i.e., has to have achieved/assumed prior to said corresponding given operating state, in order for said second user-selectable function to be executable.

Conveniently, a first user-selectable function is (block 14 shown in FIG. 3):
  selection-enabled if the current operating state is the corresponding given operating state in which said first user-selectable function is executable; or
  selection-disabled if the current operating state is not the corresponding given operating state in which said first user-selectable function is executable.

Also conveniently, a second user-selectable function is (block 14 shown in FIG. 3):
  selection-enabled if the current operating state is the corresponding given operating state in which said second user-selectable function is executable and the industrial equipment has previously achieved (i.e., prior to assume the current operating state has achieved) the corresponding specific goal(s) and/or has previously assumed (i.e., prior to assume the current operating state has assumed) the corresponding specific operating state(s); or
  selection-disabled if the current operating state is not the corresponding given operating state in which said second user-selectable function is executable, or if the industrial equipment has not previously achieved the corresponding specific goal(s), or if the industrial equipment has not previously assumed the corresponding specific operating state(s).

More conveniently, the selected-goal-dependent GUI can expose:
  either only the selection-enabled first and second user-selectable functions associated with a selected goal;
  or the selection-enabled and the selection-disabled first and second user-selectable functions associated with a selected goal.

More and more conveniently, the selected-goal-dependent GUI provides faded graphical representations of the exposed functions which are selection-disabled.

Preferably, the display control unit is further programmed to:
  in response to a selection of an exposed goal which is selection-enabled, such as a touch selection, provide the equipment control unit with data indicating the selected goal; and,
  in response to a selection of an exposed function which is selection-enabled, such as a touch selection, cause the selected function to be executed by the equipment control unit.

Conveniently, the display control unit can be further designed to store, for each user-selectable goal, also a list of the tasks associated with the operating states of the operating path associated with said user-selectable goal along with the respective actions.

More conveniently, the display control unit can be further programmed to cause, in response to a goal selection and/or a function selection, a corresponding prompt and/or pop-up and/or dialog box to be displayed on the display unit.

To put the foregoing description of the HMI in another way, said HMI, specifically the display control unit, knows the user-selectable goals and the corresponding associated operating paths in order to logically provide the selected-goal-dependent GUIs with the correct function choices and to log operating state history data in connection with the correct operating paths. The operating state history data are logged and automatically linked to the current operating state and ongoing operating path by the display control unit and/or the equipment control unit, and are used for defining performances of the industrial equipment in relation to specific operation phases, such as performances during preparation, performances during production, performances during cleaning, etc., and for analysing said performances, for instance for defining equipment mechanical efficiency during production, equipment mechanical efficiency during preparation, etc.

Figure 4:
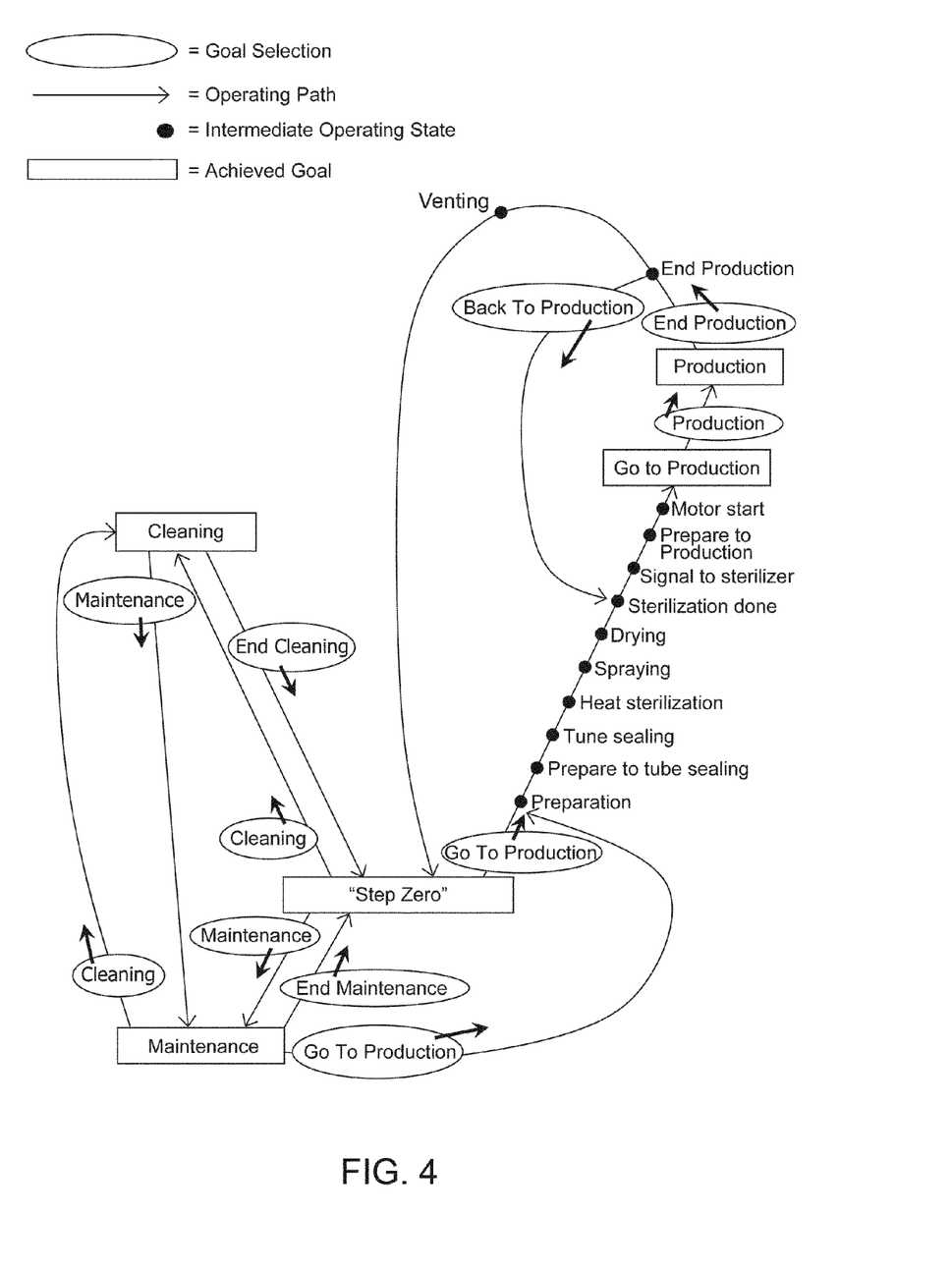
FIG. 4 schematically shows an operating logic of a goal-driven Filling Machine in a Packaging System, which goal-driven Filling Machine comprises the Human-Machine Interface (HMI) according to said preferred embodiment of the present invention.

For a better understanding of the present invention, FIG. 4 shows a diagram which schematically represents an example of an operating logic of a goal-driven Filling Machine in a Packaging System, which goal-driven Filling Machine comprises the HMI according to the afore-described preferred embodiment the present invention.

In particular, FIG. 4 schematically illustrates several goal selections (represented by ellipses) performable by means of the HMI, each goal selection causing the goal-driven Filling Machine to achieve a corresponding goal by following a corresponding operating path. In FIG. 4 the operating paths are represented by arrows and the achieved goals are represented by rectangles. Moreover, some of the operating paths shown in FIG. 4 comprise one or more respective intermediate operating state(s) (represented by black circles).

In detail, in use, the HMI enables each goal selection only in the operating state(s) from which the corresponding goal can be achieved. Specifically, in use, the user-selectable goals exposed by the goal-driven GUI displayed by the HMI depend on the current operating state of the goal-driven Filling Machine.

Moreover, the achieved goals represent also final operating states which are assumed by the goal-driven Filling Machine once it achieves said goals, and in which it is possible to execute specific functions. For example, in the achieved goal "Maintenance" it is possible to select in the corresponding selected-goal-dependent GUI displayed by the HMI all equipment-maintenance-related functions; and in the achieved goal "Cleaning" it is possible to select in the corresponding selected-goal-dependent GUI displayed by the HMI a "Daily Care" function or a "Weekly Care" function, each of which comprises one or more of the following cleaning procedures: Cold Water Rinse, Hot Water Rinse, Alkali Cleaning, Alkali Rinse, Acid Cleaning, Acid Rinse, and Drying; in particular, the exposed cleaning function depends on the product previously utilised, i.e., recipe loaded, and on the duration of production; moreover, the cleaning functions are not visible in the selected-goal-dependent GUI displayed by the HMI in the other achieved goals "Maintenance", "Go to Production", "Production", etc., thus reducing the possibility of user's errors and resulting in a lower visual information overload on the display unit when not needed.

As previously described, the functions selectable in a selected-goal-dependent GUI depend on the goal selected by a user and conveniently also on the operating states previously assumed and/or the goals previously achieved by the goal-driven Filling Machine. For example, in the achieved goal "Cleaning" it is possible to select in the corresponding selected-goal-dependent GUI displayed by the HMI a "Preparation After Daily Care" function or a "Preparation After Weekly Care" function depending on whether "Daily Care" or "Weekly Care" has been previously performed.

Finally, the HMI can be remotely connected to the equipment control unit, and could be of a type different from the one described, and in particular might not be of the touch-sensitive type, but rather might be provided with appropriate selection/activation keys, and/or one or more joystick(s), and/or one or more mouse(s), and/or one or more touchpad(s), etc.

The invention claimed is:

1. Human-Machine Interface (HMI) for an industrial equipment, the industrial equipment operable to:
    assume several operating states; and
    achieve several user-selectable goals, each achievable from one or more operating states;
    the Human-Machine Interface (HMI) designed to be coupled with an equipment control unit of the industrial equipment, the equipment control unit designed to:
        determine a current operating state assumed by the industrial equipment based on received equipment operating data;
        in response to a goal selection, cause said industrial equipment to achieve the selected goal; and
        execute equipment-related functions including user-selectable functions, each of which is associated with one or more user-selectable goals and is executed by the equipment control unit in response to a function selection;
    the Human-Machine Interface (HMI) comprising:
        a display unit; and
        a display control unit which is coupled with the display unit and is couplable also with the equipment control unit to acquire therefrom data indicative of the current operating state of the industrial equipment;
        the display control unit configured to:
            store a list of the user-selectable goals achievable by the industrial equipment, and, for each user-selectable goal,
                a list of the operating states from which said user-selectable goal is achievable, and
                a list of the user-selectable functions associated with said user-selectable goal;
            display on the display unit the user-selectable goals which are achievable from the current operating state; and
            in response to a selection of a displayed goal, display on the display unit only user-selectable functions which are associated with the selected goal.

2. The Human-Machine Interface (HMI) of claim 1, wherein the display control unit is further configured to:
    cause each user-selectable goal to be:
        selection-enabled if it is achievable from the current operating state, or
        selection-disabled if it is not achievable from the current operating state; and
    display on the display unit
        either only the selection-enabled user-selectable goals,
        or the selection-enabled and the selection-disabled user-selectable goals.

3. The Human-Machine Interface (HMI) according to claim 1, wherein, for each user-selectable goal, the user-selectable functions associated with said user-selectable goal comprise first user-selectable functions, each of which is executable by the equipment control unit in a given operating state to be assumed by the industrial equipment in order for said industrial equipment to achieve said user-selectable goal;
    and wherein the display control unit is further configured to:
        store also, for each first user-selectable function, the given operating state in which said first user-selectable function is executable;
        cause each first user-selectable function associated with a selected goal to be
            selection-enabled if the current operating state is the corresponding given operating state in which said first user-selectable function is executable, or
            selection-disabled if the current operating state is not the corresponding given operating state in which said first user-selectable function is executable; and
        display on the display unit
            either only the selection-enabled first user-selectable functions associated with a selected goal,
            or the selection-enabled and the selection-disabled first user-selectable functions associated with a selected goal.

4. The Human-Machine Interface (HMI) according to claim 1, wherein, for each user-selectable goal, the user-selectable functions associated with said user-selectable goal comprise second user-selectable functions, each of which is executable by the equipment control unit in a corresponding given operating state to be assumed by the industrial equipment in order for said industrial equipment to achieve said user-selectable goal, each second user-selectable function being executable by the equipment control unit in the corresponding given operating state only if said industrial equipment has previously achieved one or more corresponding specific goals and/or has previously assumed one or more corresponding specific operating states;

and wherein the display control unit is further configured to:
store also:
each goal achieved by the industrial equipment,
each operating state assumed by the industrial equipment, and,
for each second user-selectable function, the corresponding given operating state in which said second user-selectable function is executable, and the corresponding specific goal(s) that the industrial equipment has to have previously achieved and/or the corresponding specific operating state(s) that the industrial equipment has to have previously assumed in order for said second user-selectable function to be executable;
cause each second user-selectable function associated with a selected goal to be:
selection-enabled if the current operating state is the corresponding given operating state in which said second user-selectable function is executable and the industrial equipment has previously achieved the corresponding specific goal(s) and/or has previously assumed the corresponding specific operating state(s), or
selection-disabled if the current operating state is not the corresponding given operating state in which said second user-selectable function is executable, or if the industrial equipment has not previously achieved the corresponding specific goal(s), or if the industrial equipment has not previously assumed the corresponding specific operating state(s); and
display on the display unit:
either only the selection-enabled second user-selectable functions associated with a selected goal,
or the selection-enabled and the selection-disabled second user-selectable functions associated with a selected goal.

5. The Human-Machine Interface (HMI) according to claim 1, wherein the display control unit is configured to:
in response to a selection of a displayed goal, provide the equipment control unit with data indicating the selected goal; and
in response to a selection of a displayed function, cause the selected function to be executed by the equipment control unit.

6. The Human-Machine Interface (HMI) according to claim 1, wherein the industrial equipment is further operable to:
perform several actions; and
perform several tasks, each including one or more respective actions;
wherein each operating state assumed by the industrial equipment is associated with one or more respective tasks;
wherein each user-selectable goal is associated with a corresponding operating path to be followed by the industrial equipment in order for said industrial equipment to achieve said associated user-selectable goal, each operating path being a sequence of respective operating states comprising at least a respective initial operating state and a respective final operating state;
and wherein the display control unit is configured to store, for each user-selectable goal, also:
the operating path associated with said user-selectable goal; and
a list of the tasks associated with the operating states of the operating path associated with said user-selectable goal along with the respective action(s).

7. Method for operating a Human-Machine Interface (HMI) for an industrial equipment, the industrial equipment operable to:
assume several operating states; and
achieve several user-selectable goals, each achievable from one or more operating states;
the industrial equipment having an equipment control unit designed to:
determine a current operating state assumed by the industrial equipment based on received equipment operating data;
in response to a goal selection, cause said industrial equipment to achieve the selected goal; and
execute equipment-related functions including user-selectable functions each of which is associated with one or more user-selectable goals and is executed by the equipment control unit in response to a function selection;
the Human-Machine Interface (HMI) comprising a display unit;
the method comprising:
acquiring from the equipment control unit data indicative of the current operating state assumed by the industrial equipment;
displaying on the display unit the user-selectable goals which are achievable from the current operating state; and,
in response to a selection of a displayed goal, displaying on the display unit only user-selectable functions which are associated with the selected goal.

8. The method of claim 7, further comprising:
causing each user-selectable goal to be
selection-enabled if it is achievable from the current operating state, or
selection-disabled if it is not achievable from the current operating state; and
displaying on the display unit
either only the selection-enabled user-selectable goals,
or the selection-enabled and the selection-disabled user-selectable goals.

9. The method according to claim 7, wherein, for each user-selectable goal, the user-selectable functions associated with said user-selectable goal comprise first user-selectable functions, each of which is executable by the equipment control unit in a given operating state to be assumed by the industrial equipment in order for said industrial equipment to achieve said user-selectable goal;
and wherein the method further comprises:
causing each first user-selectable function associated with a selected goal to be:
selection-enabled if the current operating state is the given operating state in which said first user-selectable function is executable, or
selection-disabled if the current operating state is not the given operating state in which said first user-selectable function is executable; and
displaying on the display unit:
either only the selection-enabled first user-selectable functions associated with a selected goal,
or the selection-enabled and the selection-disabled first user-selectable functions associated with a selected goal.

10. The method according to claim 7, wherein, for each user-selectable goal, the user-selectable functions associated with said user-selectable goal comprise second user-selectable functions, each of which is executable by the equipment control unit in a corresponding given operating state to be assumed by the industrial equipment in order for said industrial equipment to achieve said user-selectable goal, each second user-selectable function being executable by the equipment control unit in the corresponding given operating state only if said industrial equipment has previously achieved one or more corresponding specific goals and/or has previously assumed one or more corresponding specific operating states;

and wherein the method further comprises:
causing each second user-selectable function associated with a selected goal to be:
selection-enabled if the current operating state is the corresponding given operating state in which said second user-selectable function is executable and the industrial equipment has previously achieved the corresponding specific goal(s) and/or has previously assumed the corresponding specific operating state(s), or
selection-disabled if the current operating state is not the corresponding given operating state in which said second user-selectable function is executable, or if the industrial equipment has not previously achieved the corresponding specific goal(s), or if the industrial equipment has not previously assumed the corresponding specific operating state(s); and
displaying on the display unit:
either only the selection-enabled second user-selectable functions associated with a selected goal, or the selection-enabled and the selection-disabled second user-selectable functions associated with a selected goal.

11. The method according to claim 7, further comprising:
in response to a selection of a displayed goal, providing the equipment control unit with data indicating the selected goal; and
in response to a selection of a displayed function, causing the selected function to be executed by the equipment control unit.

12. A memory of a display control unit having stored thereon software code portions, the display control unit being coupled with a display unit and with an equipment control unit of an industrial equipment;
said industrial equipment operable to:
assume several operating states; and
achieve several user-selectable goals, each achievable from one or more operating states;
said equipment control unit designed to:
determine a current operating state assumed by the industrial equipment based on received equipment operating data;
in response to a goal selection, cause said industrial equipment to achieve the selected goal; and
execute equipment-related functions including user-selectable functions, each of which is associated with one or more user-selectable goals and is executed by the equipment control unit in response to a function selection;
said software code portions being executable by said display control unit and being such that to cause, when executed, said display control unit to become configured to carry out the method claimed in claim 7.

* * * * *